US012494320B2

(12) United States Patent
Lin et al.

(10) Patent No.: US 12,494,320 B2
(45) Date of Patent: Dec. 9, 2025

(54) METHOD OF FABRICATING AN INDUCTOR DEVICE

(71) Applicant: DARFON ELECTRONICS CORP., Taoyuan (TW)

(72) Inventors: Ping-Hung Lin, Taoyuan (TW); Zuei-Chown Jou, Taoyuan (TW); Yung-Ping Wu, Taoyuan (TW); Chi-Ming Huang, Taoyuan (TW); Yao-Tsung Chen, Taoyuan (TW); Bo-Yu Huang, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 562 days.

(21) Appl. No.: 17/965,216

(22) Filed: Oct. 13, 2022

(65) Prior Publication Data

US 2023/0052178 A1 Feb. 16, 2023

Related U.S. Application Data

(62) Division of application No. 17/012,919, filed on Sep. 4, 2020, now Pat. No. 11,688,547.

(30) Foreign Application Priority Data

Sep. 20, 2019 (TW) ................................ 108134095

(51) Int. Cl.
*H01F 7/06* (2006.01)
*H01F 27/255* (2006.01)
(Continued)

(52) U.S. Cl.
CPC ........... *H01F 27/32* (2013.01); *H01F 27/255* (2013.01); *H01F 27/29* (2013.01);
(Continued)

(58) Field of Classification Search
CPC ........ H01F 3/10; H01F 41/0246; H01F 41/04; H01F 41/127; H01F 27/255; H01F 27/29;
(Continued)

(56) References Cited

U.S. PATENT DOCUMENTS

2013/0114319 A1* 5/2013 Inaba .................... H01F 27/025 363/131
2014/0320256 A1* 10/2014 Inaba ...................... H01F 37/00 336/221
(Continued)

*Primary Examiner* — Paul D Kim
(74) *Attorney, Agent, or Firm* — MUNCY, GEISSLER, OLDS & LOWE, P.C.

(57) ABSTRACT

A method of fabricating an inductor device includes preparing a conductive coil, connecting two terminals to one of two ends of the conductive coil, molding a pillar from a plurality of first composite material powders by a pressing process where each first composite material powder is composed of a first magnetic material powder coated with a first thermosetting resin, placing the pillar in a surrounding space formed by the conductive coil, molding a cladding body from a plurality of second composite powders where the second composite material powders is composed of a second magnetic material powder coated with a second thermosetting resin, heating the cladding body, the conductive coil and the pillar cladded by the cladding body such that the plurality of first magnetic material powders are bonded by the cured first thermosetting resin and the plurality of second magnetic material powders are bonded by the cured second thermosetting resin.

6 Claims, 9 Drawing Sheets

(51) Int. Cl.

| | |
|---|---|
| ***H01F 27/29*** | (2006.01) |
| ***H01F 27/32*** | (2006.01) |
| ***H01F 41/02*** | (2006.01) |
| ***H01F 41/04*** | (2006.01) |
| ***H01F 41/12*** | (2006.01) |

(52) U.S. Cl.
CPC ......... *H01F 41/0246* (2013.01); *H01F 41/04* (2013.01); *H01F 41/127* (2013.01)

(58) Field of Classification Search
CPC ........ H01F 27/292; H01F 27/32; H01F 17/04; H01F 2017/048; H01F 2003/106
See application file for complete search history.

(56) References Cited

U.S. PATENT DOCUMENTS

2016/0163446 A1* 6/2016 Park .................... H05K 9/0067
336/200
2019/0304659 A1* 10/2019 Tonogai ............. H01F 27/2823

* cited by examiner

METHOD OF FABRICATING AN INDUCTOR DEVICE

CROSS-REFERENCE TO RELATED APPLICATION

This application is a Divisional of application Ser. No. 17/012,919, filed on Sep. 4, 2020, now U.S. Pat. No. 11,688,547, for which priority is claimed under 35 U.S.C. § 120; and this application claims priority of application Ser. No. 10/813,4095 filed in TW on Sep. 20, 2019 under 35 U.S.C. § 119; the entire contents of all of which are hereby incorporated by reference.

BACKGROUND OF THE INVENTION

1. Field of the Invention

The invention relates to an inductor device and a method of fabricating the same, and in particular, to an inductor device being made of two kinds of composite powders containing thermosetting resins in different weight ratios and having high yield rate and excellent electromagnetic properties and a method fabricating the same.

2. Description of the Prior Art

Regarding the inductor device, a prior art is to embed a conductive coil in a plurality of magnetic material powders coated with a thermosetting resin, and then to heat the magnetic material powders to cure the thermosetting resin and to bond the magnetic material powders by the cured thermosetting resin to form an inductor device. The aforesaid type of inductor device is also called "powder-compacted inductor". The powder-compacted inductors can be made into small-sized and low-profile devices, while also including excellent anti-noise, magnetic shielding and high saturation current characteristics. Therefore, for the design of inductor devices for power supplies, powder-compacted inductors are often used in portable electronic apparatuses such as notebook computers that require high miniaturization and thinning.

If powder-compacted inductors are to be used in larger electronic apparatuses, the magnetic properties of the powder inductors must be improved. The improvement of the magnetic properties of powder-compacted inductors can be achieved by increasing the permeability of the magnetic material powders coated with the thermosetting resin. In general, there are two approaches to increase the permeability of the magnetic material powders coated with the thermosetting resin: one is to increase the iron content of the magnetic powder, but this approach will make the powder-compacted inductors are easy to rust; the other is to reduce the content of thermosetting resin, but this approach will reduce the strength of the powder-compacted inductors. Therefore, the above two approaches are not the best considerations for improving the magnetic properties of powder inductors.

In addition, the magnetic permeability of the part surrounded by the conductive coil of the powder-compacted inductor actually accounts for more than half of the overall magnetic permeability of the powder-compacted inductor. Therefore, another prior art is to place a rigid magnetic pillar in a conductive coil, to clad the conductive coil and the rigid magnetic pillar covered with a plurality of magnetic material powders coated with a thermosetting resin, to mold the magnetic material powders by a pressing process, and then to heat and cure the thermosetting resin to bond the magnetic material powders to finish the inductor device. However, due to the large difference in rigidity, expansion coefficient and bondability between the rigid magnetic pillar and other parts of the inductor device, and the inductor device, made according to the process of another prior art, easily exists cracks occurring the top surface of the inductor device near the pillar. Therefore, the yield rate of the process of another prior art is low, and the quality risk of the inductor device of another prior art in long-term use is high. In addition, the advantage of the integrally molded powder-compacted inductor is its high saturation current. Compared with the integrally molded powder-compacted inductor, the inductor device made of rigid magnetic pillar will reduce the current withstand characteristics.

With the description of the prior art for powder-compacted inductors, it is clear that there is still space for improvement by using magnetic material powders to manufacture inductor devices with high yield rate and excellent electromagnetic properties.

SUMMARY OF THE INVENTION

Accordingly, one scope of the invention is to provide an inductor device being made of two kinds of composite powders containing thermosetting resins in different weight ratios and having high yield rate and excellent electromagnetic properties and a method fabricating the same.

An inductor device according to a preferred embodiment of the invention includes a conductive coil, an insulating layer, two terminals, a pillar and a cladding body. The insulating layer is formed to overlay an outer surface of the conductive coil. The two terminals are respectively electrically connected to one of two ends of the conductive coil. The pillar is molded from a plurality of first composite material powders by a pressing process. Each first composite material powder is composed of a first magnetic material powder coated with a first thermosetting resin. The pillar is placed in a surrounding space formed by the conductive coil. The cladding body is molded from a plurality of second composite powders. Each second composite material powders is composed of a second magnetic material powder coated with a second thermosetting resin. The cladding body clads the conductive coil and the pillar, and the two terminals are exposed outside the cladding body. A first weight ratio of the first thermosetting resin to the first composite material powders is less than a second weight ratio of the second thermosetting resin to the second composite material powders. The cladding body, the conductive coil and the pillar cladded by the cladding body are heated to a curing temperature such that the plurality of first magnetic material powders are bonded by the cured first thermosetting resin and the plurality of second magnetic material powders are bonded by the cured second thermosetting resin.

A method of fabricating an inductor device according to a preferred embodiment of the invention, firstly, is to prepare a conductive coil, where an outer surface of the conductive coil is overlaid by an insulating layer. Next, the method of the invention is to respectively electrically connect two terminals to one of two ends of the conductive coil. Then, the method of the invention is to mold a pillar from a plurality of first composite material powders by a pressing process where each first composite material powder is composed of a first magnetic material powder coated with a first thermosetting resin. Subsequently, the method of the invention is to place the pillar in a surrounding space formed by the conductive coil. Afterward, the method of the invention is to mold a cladding body from a plurality of second composite powders where each second composite material powders is composed of a second magnetic material powder coated with a second thermosetting resin. The cladding body clads the conductive coil and the pillar. The two terminals are exposed outside the cladding body. A first weight ratio of the first thermosetting resin to the first composite material powders is less than a second weight ratio of the second thermosetting resin to the second composite material powders. Finally, the method of the invention is to heat the cladding body, the conductive coil and the pillar cladded by the cladding body to a curing temperature such that the plurality of first magnetic material powders are bonded by the cured first thermosetting resin and the plurality of second magnetic material powders are bonded by the cured second thermosetting resin.

In one embodiment, the first weight ratio of the first thermosetting resin to the first composite material powders is in a range of from 0 to 3.5%. The second weight ratio of the second thermosetting resin to the second composite material powders is in a range of larger than 3.5%.

In one embodiment, the pillar has a molding density after being molded by the pressing process, and the molding density is equal to or greater than 4.9 $g/cm^3$.

In one embodiment, a first outer diameter of a tail end of the pillar is smaller than an inner diameter of the surrounding space.

In one embodiment, the pillar includes a flange formed at a top of the pillar. A second outer diameter of the flange is smaller than the inner diameter of the surrounding space.

In one embodiment, the pillar, molded by the pressing process, first undergoes a sintering process, and then is placed in the surrounding space formed by the conductive coil.

Distinguishable from the prior arts, the inductor device according to the invention is made of two kinds of composite powders containing thermosetting resins in different weight ratios, and has excellent electromagnetic properties. The inductor device, fabricated according to the method of the invention, has high yield rate, and the quality risk of the inductor device in long-term use is low.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
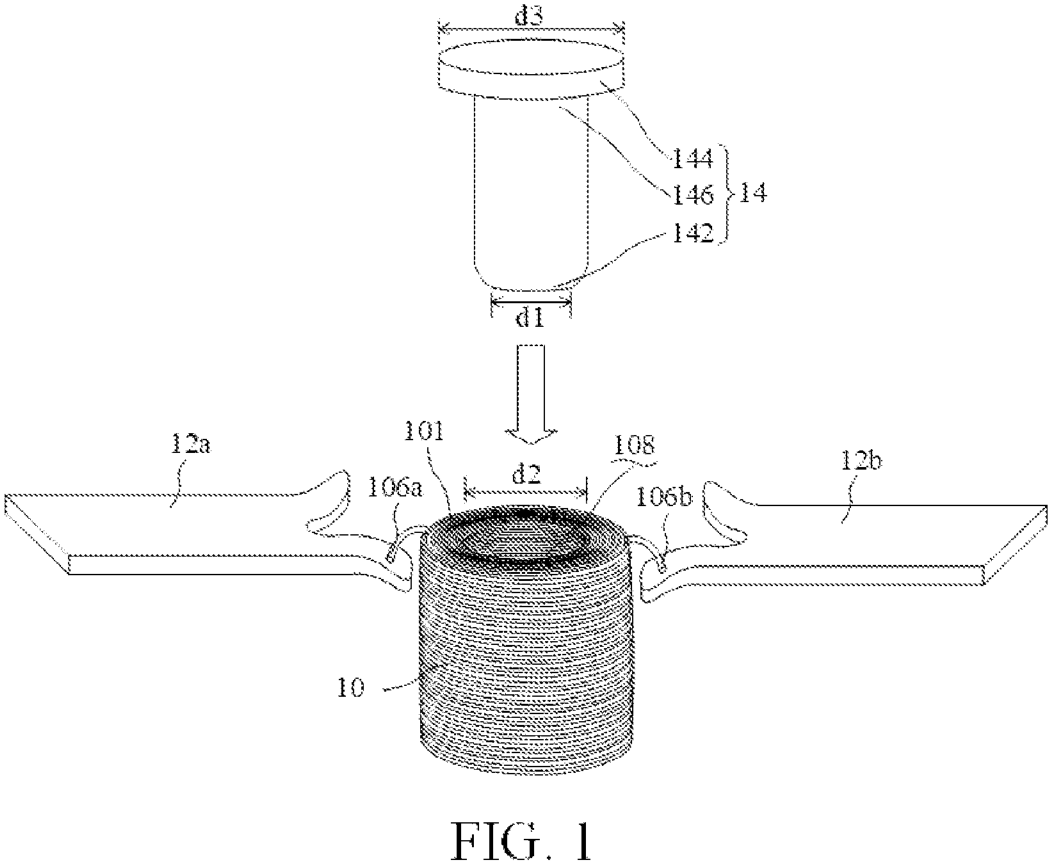
FIG. 1 is an exploded view of some components and members of an inductor device according to a preferred embodiment of the invention.
Figure 2:
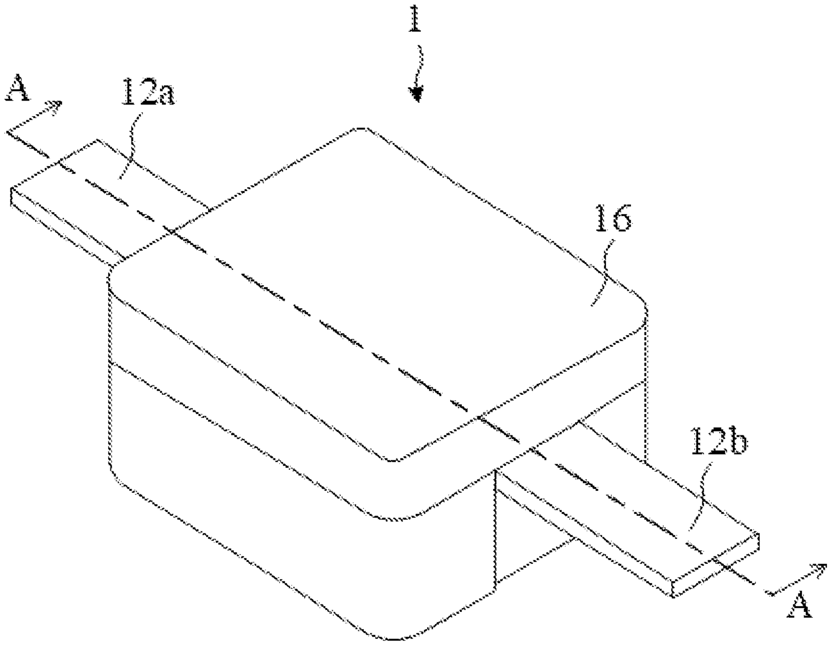
FIG. 2 is a perspective view of the inductor device according to the preferred embodiment of the invention.
Figure 3:
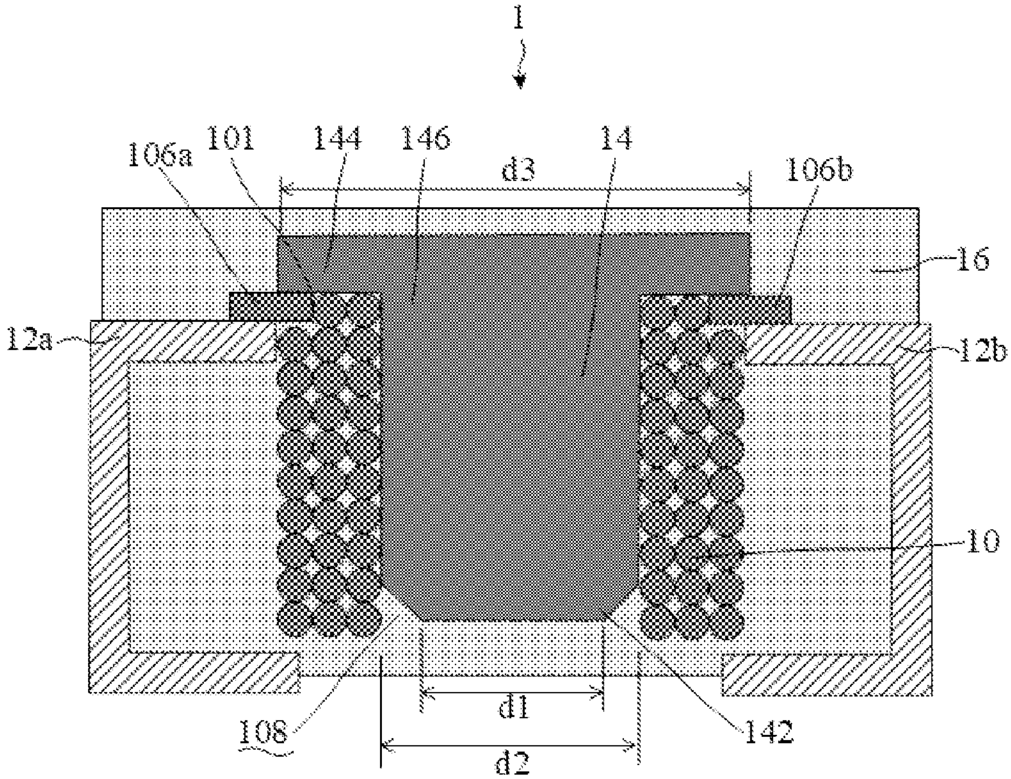
FIG. 3 is a cross sectional view of the inductor device taken along the A-A line of FIG. 2.
Figure 4:
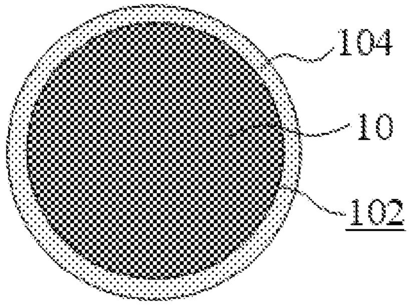
FIG. 4 is a cross-sectional view of a conductive coil, an essential component of the inductor device according to the preferred embodiment of the invention.

Referring to FIGS. 2 to 4, those drawings schematically illustrate an inductor device 1 according to the preferred embodiment of the invention. FIG. 1 is an exploded view schematically illustrating some components and members of the inductor device 1 according to the preferred embodiment of the invention. FIG. 2 is a perspective view schematically illustrating the inductor device 1 according to the preferred embodiment of the invention. FIG. 3 is a cross sectional view of the inductor device 1 taken along the A-A line of FIG. 2. FIG. 4 is a cross-sectional view of a conductive coil 10, an essential component of the inductor device 1 according to the preferred embodiment of the invention.

As shown in FIG. 1, FIG. 2 and FIG. 3, the inductor device 1 according to the preferred embodiment of the invention includes a conductive coil 10, an insulating layer 104, two terminals (12*a*, 12*b*), a pillar 14 and a cladding body 16.

As shown in FIG. 4, the insulating layer 104 is formed to overlay an outer surface 102 of the conductive coil 10.

The two terminals (12*a*, 12*b*) are respectively electrically connected to one of two ends (106*a*, 106*b*) of the conductive coil 10.

The pillar 14 is molded from a plurality of first composite material powders by a pressing process. Each first composite material powder is composed of a first magnetic material powder coated with a first thermosetting resin.

In one embodiment, the first magnetic material powders can be carbonyl iron powders, iron-chromium-silicon alloy powders, iron-silicon alloy powders, amorphous iron-based alloy powders, iron-silicon alloy powders, iron-aluminum-silicon alloy powders, manganese-zinc ferrite powders, nickel-zinc ferrite powders, or other magnetic material powders.

The pillar 14 is placed in a surrounding space 108 formed by the conductive coil 10.

The cladding body 16 is molded from a plurality of second composite powders. Each second composite material powders is composed of a second magnetic material powder coated with a second thermosetting resin.

In one embodiment, the second magnetic material powders can be carbonyl iron powders, iron-chromium-silicon alloy powders, iron-silicon alloy powders, amorphous iron-based alloy powders, iron-silicon alloy powders, iron-aluminum-silicon alloy powders, manganese-zinc ferrite powders, nickel-zinc ferrite powders, or other magnetic material powders. The material forming the second magnetic material powders can be the same as or different from the material forming the first magnetic material powders.

The cladding body 16 clads the conductive coil 10 and the pillar 14, and the two terminals (12*a*, 12*b*) are exposed outside the cladding body 16.

The cladding body 16, the conductive coil 10 and the pillar 14 cladded by the cladding body 16 are heated to a curing temperature such that the plurality of first magnetic material powders are bonded by the cured first thermosetting resin and the plurality of second magnetic material powders are bonded by the cured second thermosetting resin.

In particular, a first weight ratio of the first thermosetting resin to the first composite material powders is less than a second weight ratio of the second thermosetting resin to the second composite material powders. Thereby, the differences between the rigidity and thermal expansion coefficient of the pillar 14 and those of the part of the cladding body 16 adjacent to the pillar 14 will not be too different, so there are no cracks occurring the top surface of the inductor device 1 according to the invention near the pillar 14.

In one embodiment, the first weight ratio of the first thermosetting resin to the first composite material powders is in a range of from 0 to 3.5%. The second weight ratio of the second thermosetting resin to the second composite material powders is in a range of larger than 3.5%.

In one embodiment, the pillar 14 has a molding density after being molded by the pressing process, and the molding density is equal to or greater than 4.9 g/cm$^3$.

In one embodiment, as shown in FIG. 1 and FIG. 3, a first outer diameter d1 of a tail end 142 of the pillar 14 is smaller than an inner diameter d2 of the surrounding space 108 formed by the conductive coil 10.

In one embodiment, also as shown in FIG. 1 and FIG. 3, the pillar 14 includes a flange 144 formed at a top 146 of the pillar 14. A second outer diameter d3 of the flange 144 is smaller than the inner diameter d2 of the surrounding space 108 formed by the conductive coil 10.

In one embodiment, the pillar 14, molded by the pressing process, first undergoes a sintering process, and then is placed in the surrounding space 108 formed by the conductive coil 10.

Figure 5:
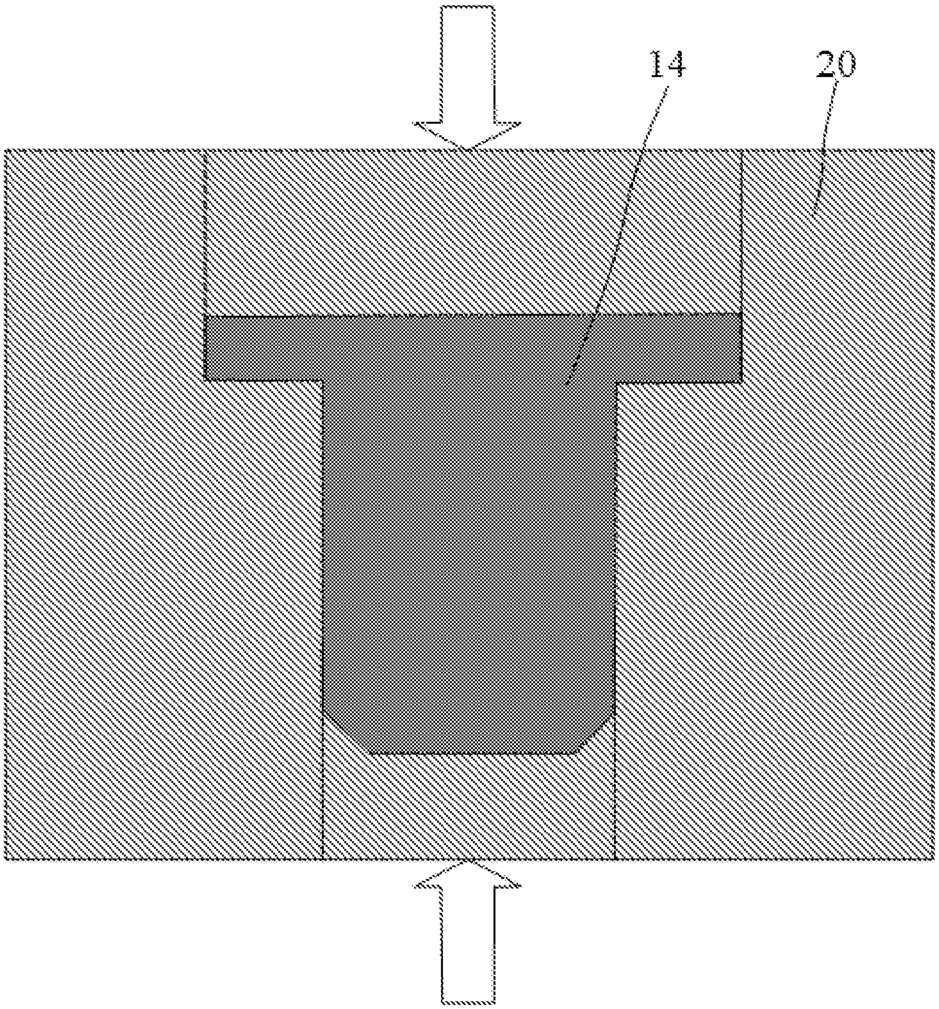
FIG. 5 is a cross-sectional view of a stage of an inductor device fabricated by a method according to a preferred embodiment of the invention.
Figure 6:
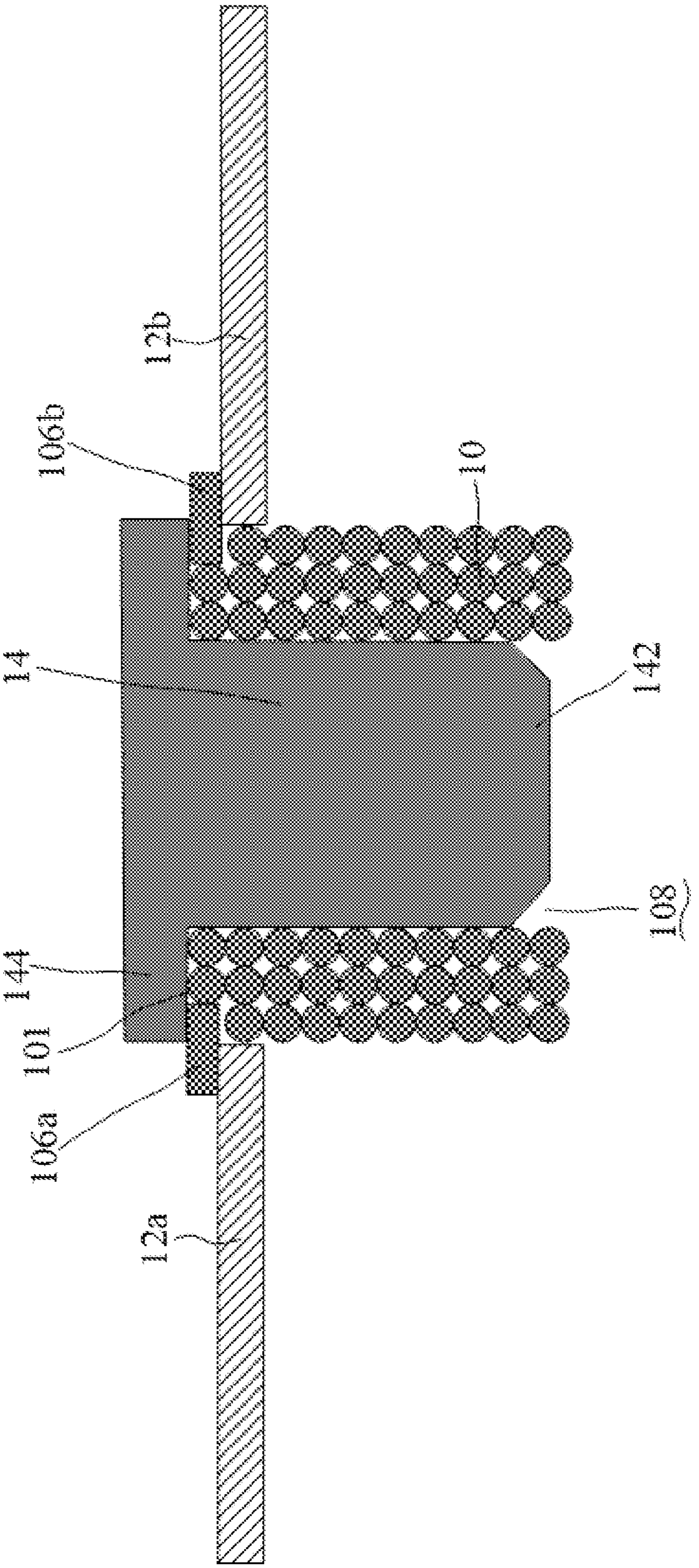
FIG. 6 is a cross-sectional view of another stage of the inductor device fabricated by the method according to the preferred embodiment of the invention.
Figure 7:
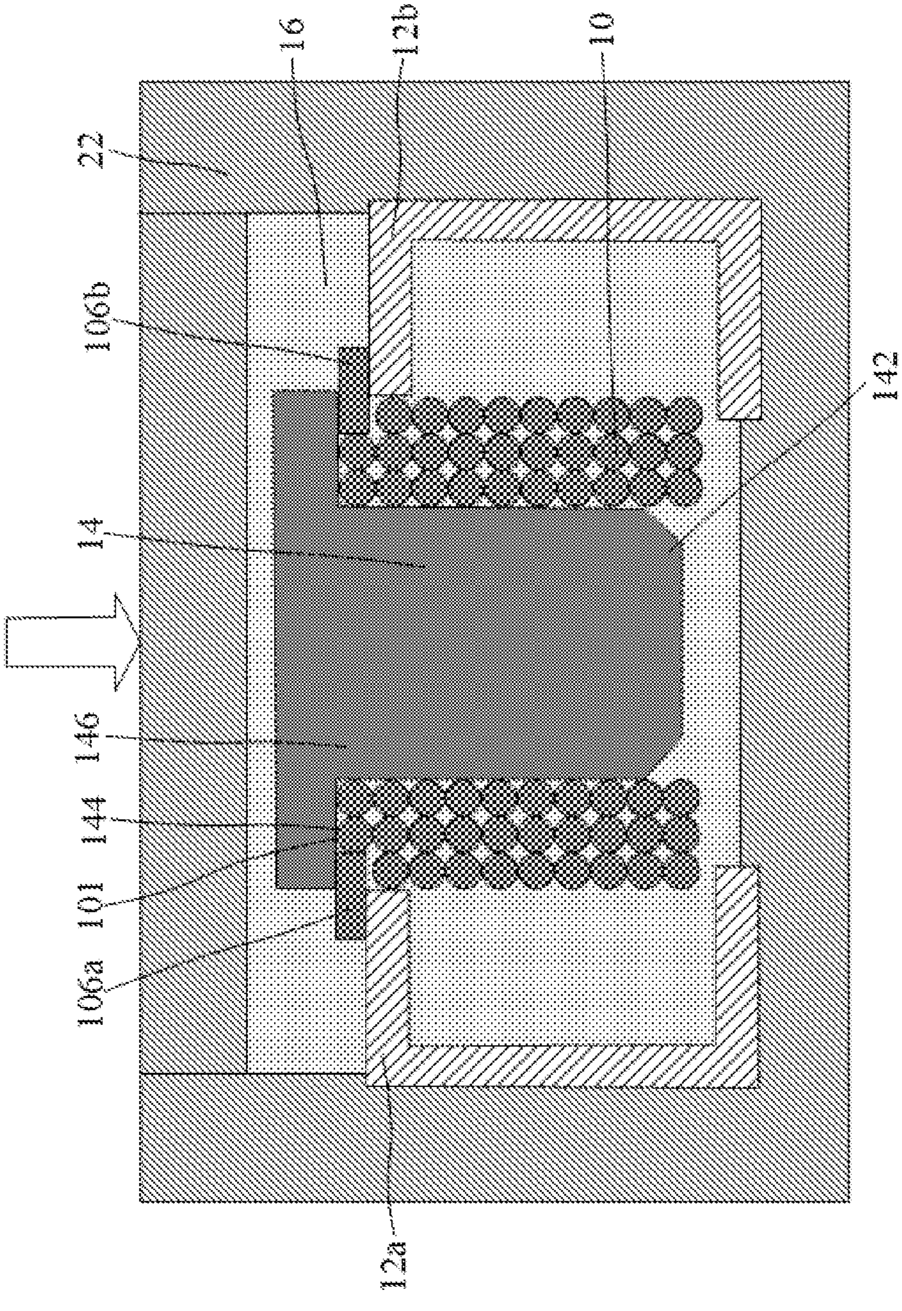
FIG. 7 is a cross-sectional view of another stage of the inductor device fabricated by the method according to the preferred embodiment of the invention.

Referring to FIGS. 5 through 7, those drawings with cross sectional views schematically illustrate the method according to the preferred embodiment of the invention to fabricate the inductor device 1 as shown in FIG. 3.

Firstly, the method of the invention is to prepare a conductive coil 10, where an outer surface 102 of the conductive coil 10 is overlaid by an insulating layer 104, as shown in FIG. 4.

Next, the method of the invention is to respectively electrically connect two terminals (12*a*, 12*b*) to one of two ends (106*a*, 106*b*) of the conductive coil 10 as shown in FIG. 1. In one embodiment, the two terminals (12*a*, 12*b*) and other terminals can be integrally formed by punching a metal plate into a lead frame which includes these terminals and can be used for mass and automated production.

Then, as shown in FIG. 5, the method of the invention is to mold a pillar 14 from a plurality of first composite material powders by a pressing process by use of a first pressing equipment 20. Each first composite material powder is composed of a first magnetic material powder coated with a first thermosetting resin.

In one embodiment, the first magnetic material powders can be carbonyl iron powders, iron-chromium-silicon alloy powders, iron-silicon alloy powders, amorphous iron-based alloy powders, iron-silicon alloy powders, iron-aluminum-silicon alloy powders, manganese-zinc ferrite powders, nickel-zinc ferrite powders, or other magnetic material powders.

Subsequently, as shown in FIG. 6, the method of the invention is to place the pillar 14 in a surrounding space 108 formed by the conductive coil 10.

Afterward, as shown in FIG. 7, the method of the invention is to mold a cladding body 16 from a plurality of second composite powders by use of a second pressing equipment 22. Each second composite material powders is composed of a second magnetic material powder coated with a second thermosetting resin. The cladding body 16 clads the conductive coil 10 and the pillar 14. The two terminals (12*a*, 12*b*) are exposed outside the cladding body 16.

In one embodiment, the second magnetic material powders can be carbonyl iron powders, iron-chromium-silicon alloy powders, iron-silicon alloy powders, amorphous iron-based alloy powders, iron-silicon alloy powders, iron-aluminum-silicon alloy powders, manganese-zinc ferrite powders, nickel-zinc ferrite powders, or other magnetic material powders. The material forming the second magnetic material powders can be the same as or different from the material forming the first magnetic material powders.

Finally, the method of the invention is to heat the cladding body 16, the conductive coil 10 and the pillar 14 cladded by the cladding body 16 to a curing temperature such that the plurality of first magnetic material powders are bonded by the cured first thermosetting resin and the plurality of second magnetic material powders are bonded by the cured second thermosetting resin. The two terminals (12*a*, 12*b*) can be bent to the bottom of the cladding body 16, as shown in FIG. 7.

In particular, a first weight ratio of the first thermosetting resin to the first composite material powders is less than a second weight ratio of the second thermosetting resin to the second composite material powders. Thereby, the differences between the rigidity and thermal expansion coefficient of the pillar 14 and those of the part of the cladding body 16 adjacent to the pillar 14 will not be very different, so there are no cracks occurring the top surface of the inductor device 1 according to the invention near the pillar 14. Therefore, the inductor device 1 fabricated by the method according to the invention has high yield rate.

In one embodiment, the first weight ratio of the first thermosetting resin to the first composite material powders is in a range of from 0 to 3.5%. The second weight ratio of the second thermosetting resin to the second composite material powders is in a range of larger than 3.5%.

In one embodiment, the pillar 14 has a molding density after being molded by the pressing process, and the molding density is equal to or greater than 4.9 g/cm$^3$.

In one embodiment, also as shown in FIG. 1 and FIG. 3, a first outer diameter d1 of a tail end 142 of the pillar 14 is smaller than an inner diameter d2 of the surrounding space 108 formed by the conductive coil 10. Thereby, when the pillar 14 is placed in the surrounding space 108 formed by the conductive coil 10, the tail end 142 of the pillar 14 can be prevented from scratching the insulating layer 104.

In one embodiment, also as shown in FIG. 1 and FIG. 3, the pillar 14 includes a flange 144 formed at a top 146 of the pillar 14. A second outer diameter d3 of the flange 144 is smaller than the inner diameter d2 of the surrounding space 108 formed by the conductive coil 10. Thereby, when the pillar 14 is placed in the surrounding space 108 formed by the conductive coil 10, the flange 144 of the pillar 14 can lean on the top 101 of the conductive coil 10.

In one embodiment, the pillar 14, molded by the pressing process, first undergoes a sintering process, and then is placed in the surrounding space 108 formed by the conductive coil 10.

Figure 8:
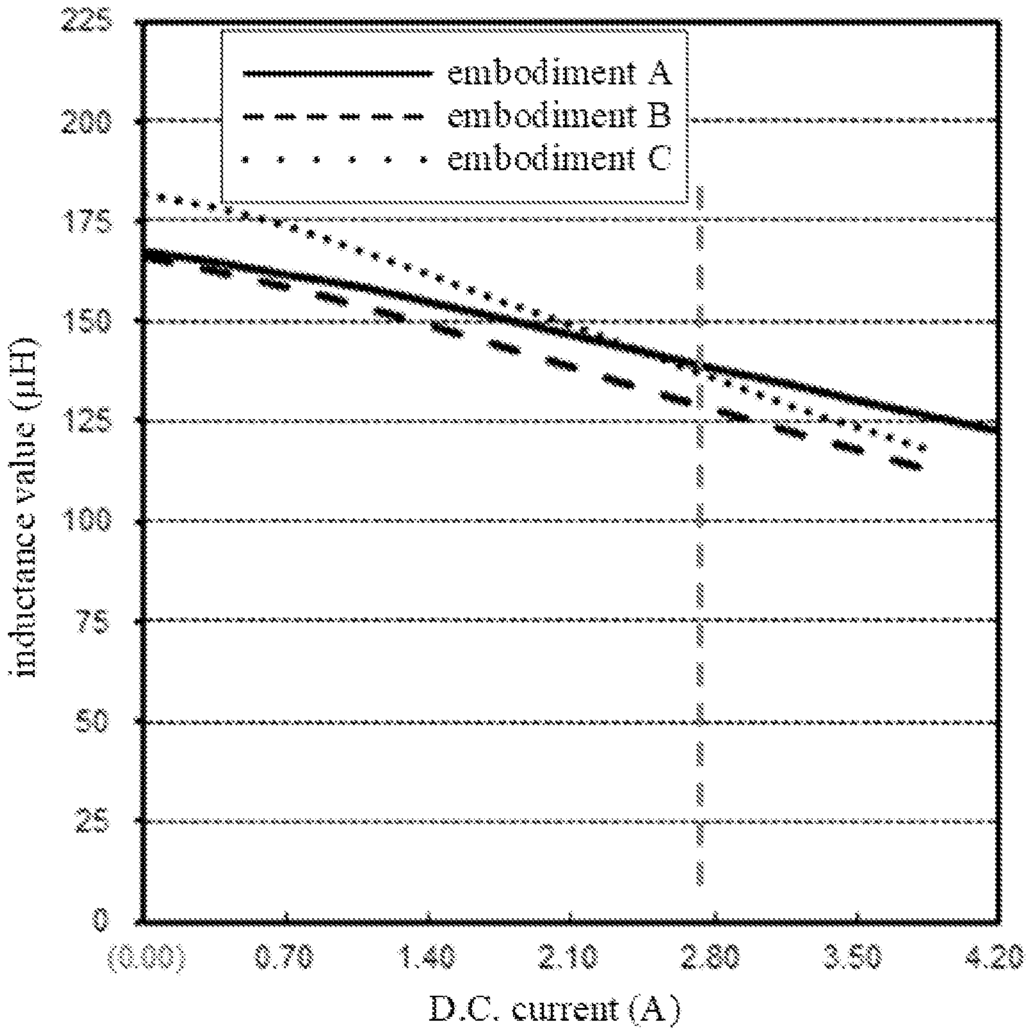
FIG. 8 is a diagram showing the inductance value test results of three examples of the invention at different applied currents.
Figure 9:
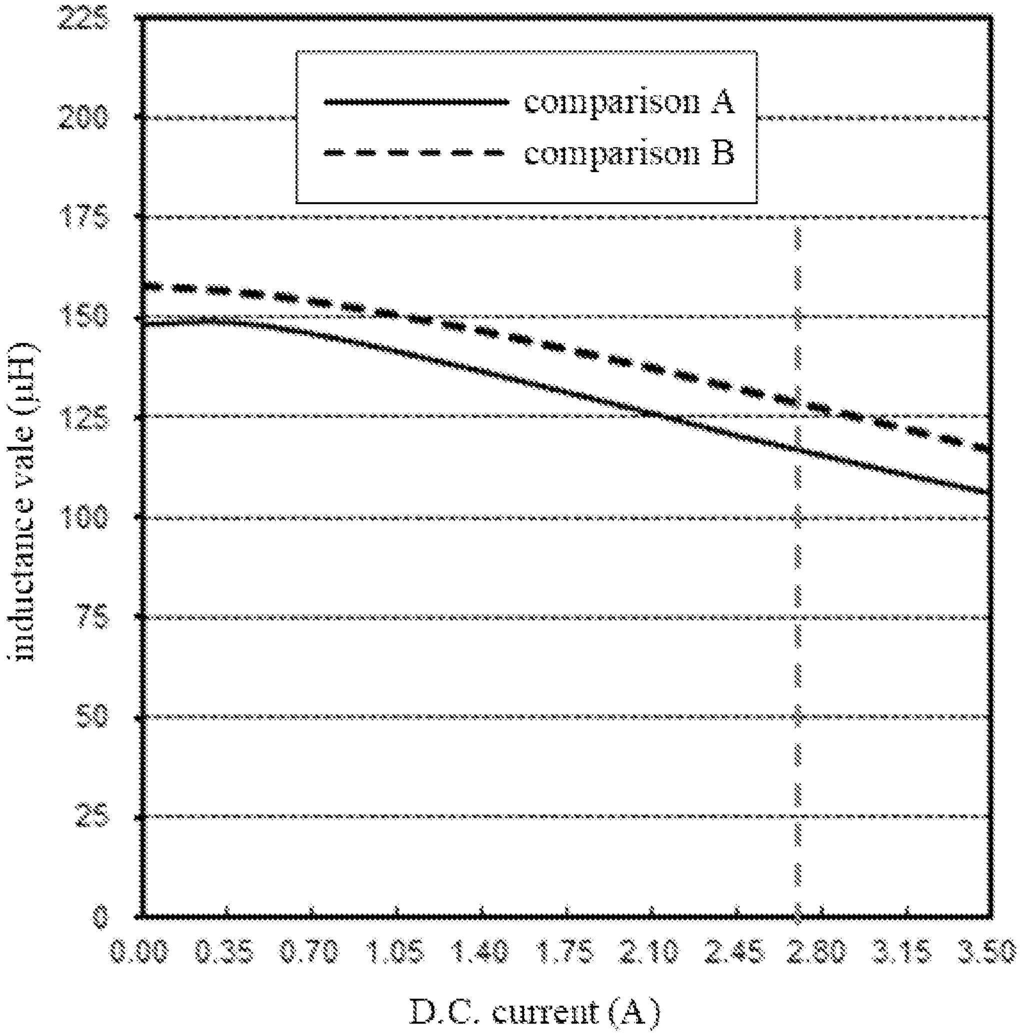
FIG. 9 is a diagram showing the inductance test results of two examples of powder-compacted inductors of the prior art at different applied currents.
Figure 10:
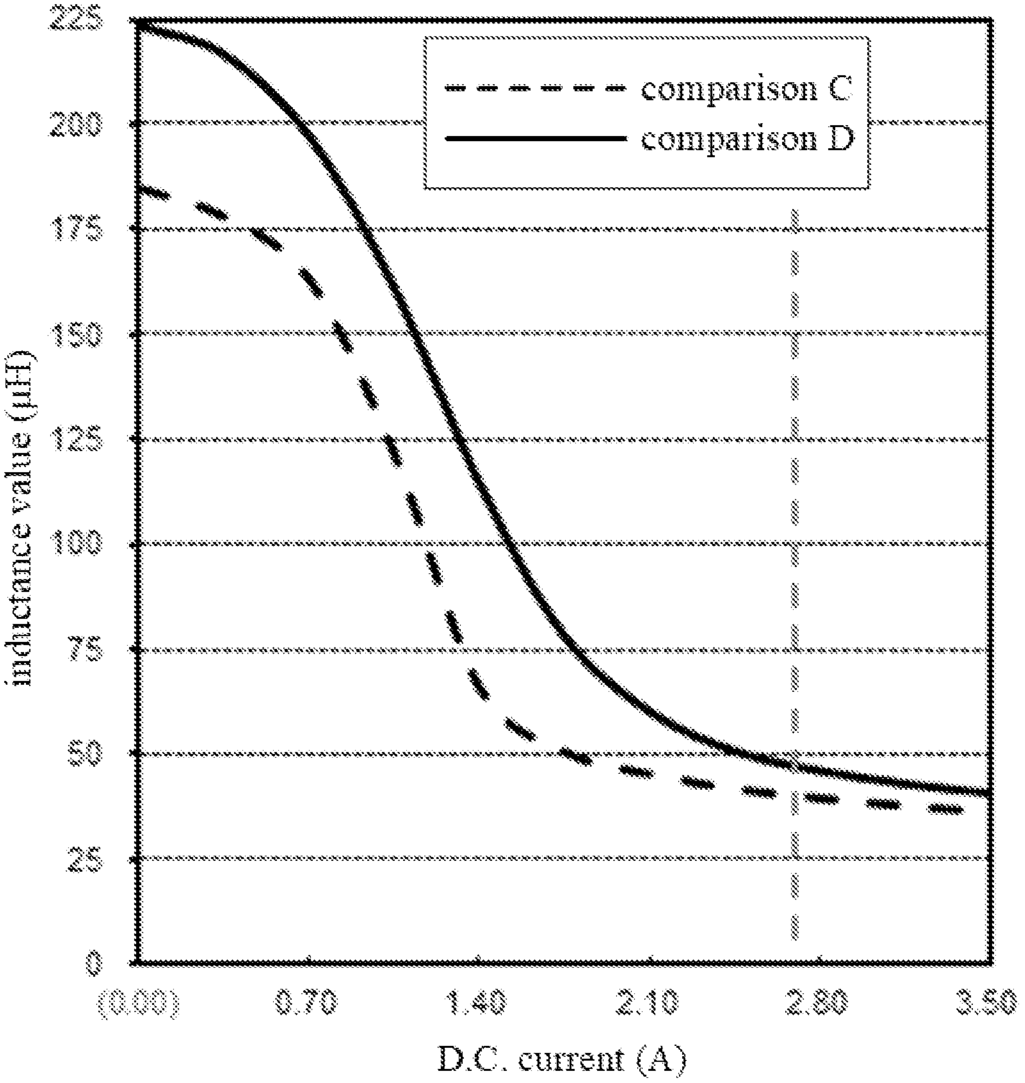
FIG. 10 is a diagram showing the inductance test results of two examples of inductor devices using rigid magnetic pillars of another prior art at different applied currents.

Please refer to FIG. 8, FIG. 9 and FIG. 10, FIG. 8 shows the inductance value test results of three embodiments of the invention (embodiment A, embodiment B and embodiment C) at different applied currents. In contrast, the inductance value test results of two examples of the prior art powder-compacted inductors (comparison A and comparison B) at different applied currents are shown in FIG. 9. Similarly, in contrast, the inductance test results of two examples of inductor devices of another prior art using rigid magnetic pillars (comparison C and comparison D) at different applied currents are shown in FIG. 10. The dimensions of the tested inductor devices are all 13 mm×13 mm×6 mm. The coil winding gauge of the tested inductor devices are all: wire diameter being 0.34 mm, the outer diameter of the cylinder being 4.6 mm, and the number of turns being 52.5 Ts. The material composition and electromagnetic properties of the above tested inductor devices are listed in Table 1.

TABLE 1

| tested inductor device | material of pillar | material of cladding body | inductance value of inductor device (μH) |
|---|---|---|---|
| embodiment A | carbonyl iron powders, average particle size: 5 μm, weight ratio of thermosetting resin <3.5 wt. % | iron-chromium-silicon alloy powders, average particle size: 10 μm, weight ratio of thermosetting resin: 4 wt. % | 151.35~164.20 |
| embodiment B | iron-chromium-silicon alloy powders, average particle size: 10 μm, weight ratio of thermosetting resin <3.5 wt. % | iron-chromium-silicon alloy powders, average particle size: 10 μm, weight ratio of thermosetting resin: 4 wt. % | 162.00~167.00 |
| embodiment C | iron-chromium-silicon alloy powders, average particle size: 24 μm, weight ratio of thermosetting resin <3.5 wt. % | iron-chromium-silicon alloy powders, average particle size: 10 μm, weight ratio of thermosetting resin: 4 wt. % | 165.60~172.20 |
| comparison A | — | iron-chromium-silicon alloy powders, average particle size: 10 μm, weight ratio of thermosetting resin: 4 wt. % | 146.77~147.60 |
| comparison B | — | amorphous iron-based alloy powders, average particle size: 15 μm, weight ratio of thermosetting resin: 4 wt. % | 148.59~150.48 |
| comparison C | nickel-zinc alloy | iron-chromium-silicon alloy powders, average particle size: 10 μm, weight ratio of thermosetting resin: 4 wt. % | 184.80~197.90 |
| comparison D | manganese-zinc alloy | iron-chromium-silicon alloy powders, average particle size: 10 μm, weight ratio of thermosetting resin: 4 wt. % | 208.5 |

Regarding the cladding bodies of the above tested inductor devices, except that the inductance value of the powders forming the cladding body of comparison B is 148.59~150.48 H, the inductance values of the powders forming the cladding bodies of the others are 146.77~147.60 μH.

When inductor devices are in use, their inductance will decrease due to flowing through of current to cause the inductor devices to lose their functions, such as energy storage, filtering, and other functions. Therefore, when an inductor device is at a specific current (customer application current), a decrease rate in the inductance value of the inductor device is as little as possible. This specific current is generally called "saturation current". In the above test of the inductor devices, the saturation current is set to 2.7~2.8 A.

Regarding the decrease rate in inductance value of an inductor devices as the current flows through, it can be calculated. As an example, an inductor device has the inductance value of 148.3 pH as no current flows through, and the inductance value of 115.5 H as the saturation current is set to 2.8 A. The decrease rate in inductance value of the aforesaid inductor device is calculated as the following:

the decrease rate in inductance value=(115.5−148.3)/148.3=−22.12%.

As the set saturation current is set to 2.7 A, the calculated decrease rates (ΔL/L) in inductance values of the above tested inductor devices are listed in Table 2.

TABLE 2

| tested inductor device | decrease rate in inductance value |
|---|---|
| embodiment A | −13.24%~−13.97% |
| embodiment B | −20.98%~−22.75% |
| embodiment C | −20.47%~−21.33% |
| comparison A | −20.44%~−20.69% |
| comparison B | −16.71%~−16.86% |
| comparison C | −74.43%~−78.34% |
| comparison D | −73.38% |

Taking comparison A and comparison B as the basis of comparison, the test results shown in FIGS. 8, 9 and 10 can confirm that the inductance values of the finished products of the embodiments of the invention (embodiment A, embodiment B and embodiment C), without current flowing through, is slightly increased and up to 1.17 times. The inductance value of the finished products of the examples (comparison C, comparison D) manufactured by using rigid magnetic pillars, without current flowing through, is significantly increased, and can be increased and up to 1.52 times. However, the inductance value of the inductor devices of the examples (comparison C, comparison D) manufactured by using rigid magnetic pillars has a significant decrease rate in inductance value, and the highest decrease among the inductance values of the inductor devices is 57.1%. In the embodiments of the invention (embodiment A, embodiment B and embodiment C), the decrease rates in inductance values are significantly improved, which can be improved by 7.2%. Obviously, the inductor device according to the invention has unexpected effects.

With detailed description of the invention above, it is clear that the inductor device according to the invention is made of two kinds of composite powders containing thermosetting resins in different weight ratios, and has excellent electromagnetic properties. The inductor device, fabricated according to the method of the invention, has high yield rate, and the quality risk of the inductor device in long-term use is low.

With the embodiment and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method of fabricating an inductor device, comprising the steps of:

(a) preparing a conductive coil, constituted by a circular wire being spirally wound to form multi-layer turns, wherein an outer surface of the circular wire of the conductive coil is overlaid by an insulating layer;

(b) respectively electrically connecting two terminals to one of two ends of the conductive coil;

(c) molding a pillar from a plurality of first composite material powders by a pressing process, wherein each first composite material powder is composed of a first magnetic material powder coated with a first thermosetting resin;

(d) placing the pillar in a surrounding space formed by the conductive coil;

(e) molding a cladding body from a plurality of second composite material powders, wherein each second composite material powder is composed of a second magnetic material powder coated with a second thermosetting resin, the cladding body clads the conductive coil, two portions terminals connected with the ends of the conductive coil and the pillar, the two terminals are exposed outside the cladding body, a first weight ratio of the first thermosetting resin to the first composite material powders is less than a second weight ratio of the second thermosetting resin to the second composite material powders, the first weight ratio is in a range of from 0 to 3.5%; and (f) heating the cladding body and the conductive coil and the pillar cladded by the cladding body to a curing temperature such that the plurality of first magnetic material powders are bonded by the cured first thermosetting resin and the plurality of second magnetic material powders are bonded by the cured second thermosetting resin.

2. The method of claim 1, wherein the second weight ratio is in a range of larger than 3.5%.

3. The method of claim 2, wherein the pillar has a molding density after being molded by the pressing process, and the molding density is equal to or greater than 4.9 $g/cm^3$.

4. The method of claim 2, wherein a first outer diameter of a tail end of the pillar is smaller than an inner diameter of the surrounding space.

5. The method of claim 4, wherein the pillar comprises a flange formed at a top of the pillar, a second outer diameter of the flange is smaller than the inner diameter of the surrounding space.

6. The method of claim 2, between step (c) and step (d), further comprising the step of performing a sintering process for the pillar.

* * * * *